United States Patent [19]
Lockwood et al.

[11] 3,837,025
[45] Sept. 24, 1974

[54] SHOE MAKING

[75] Inventors: Charles Alfred Lockwood, Kettering; Frederick William Frank Goffe, Broughton; Ronald Julian, Kettering, all of England

[73] Assignee: The Shoe and Allied Trades Research Association, Kettering, England

[22] Filed: Apr. 6, 1973

[21] Appl. No.: 348,710

[30] Foreign Application Priority Data
Apr. 11, 1972 Great Britain.................... 16727/72

[52] U.S. Cl................................. 12/54.1, 12/135 A
[51] Int. Cl..................... A43d 11/00, A43d 3/00
[58] Field of Search ............... 12/51, 52, 53.1, 54.1, 12/54.4, 135 A

[56] References Cited
UNITED STATES PATENTS

| | | | |
|---|---|---|---|
| 2,301,785 | 11/1942 | Marx.................................. | 12/54.1 |
| 3,284,827 | 11/1966 | Tutt et al............................ | 12/54.1 |
| 3,309,723 | 3/1967 | Dew................................... | 12/54.1 |
| 3,619,838 | 11/1971 | Winkler............................. | 12/135 A |

*Primary Examiner*—Patrick D. Lawson
*Attorney, Agent, or Firm*—Lerner, David, Littenberg & Samuel

[57] ABSTRACT

A shoe upper preforming apparatus includes a clamp for gripping the forepart of a fully closed upper to be preformed, a backpart mould, and a forepart mould. Actuators are provided for first moving the backpart mould along an arcuate path into a moulding position within the upper and thereafter moving the forepart mould into the moulding position. The movement of the forepart mould comprises bodily movement having components both upwards and forwards relative to the shoe upper and rotary movement, the bodily movement being effected initially with the toe end of the forepart mould raised, and the rotary movement causing the toe end to move downwardly as the forepart mould is brought to its final moulding position. When the moulds are in the moulding position they interfit to define a moulding surface corresponding to the whole of the upper, which surface may be in the shape of the last or a development of the shape of the last. The backpart mould may be cooled and the forepart mould may be heated or cooled according to the type of material to be formed. A gauge is provided for determining the height of the heel of the upper relative to the backpart mould when the backpart mould is moved to its moulding position, and a female back former is provided for assisting in the forming of the backpart of the upper. A wiper mechanism is included for wiping the lasting margin of the backpart of the upper beneath the backpart mould. The clamp can be formed in two halves which can be pivoted apart for accommodating different sizes of mould, which may therefore be removable from the machine, and power means may be provided for effecting the pivoting of the two clamp halves so that the upper can be loaded into the clamp in a relatively flat condition and then the clamp halves pivoted towards each other in preparation for the moulding operation.

46 Claims, 36 Drawing Figures

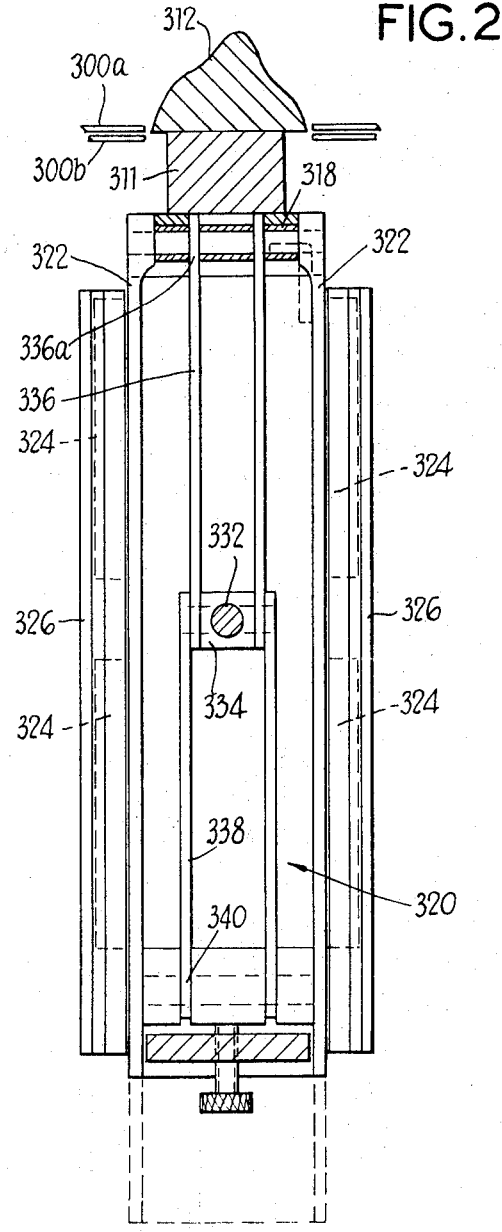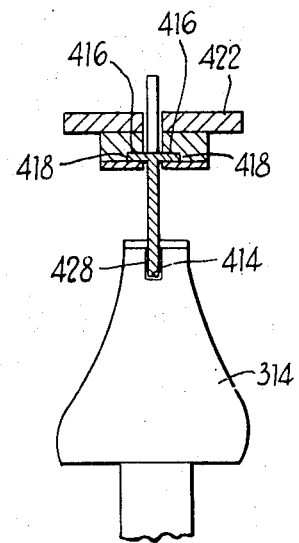
FIG. 2
FIG. 7

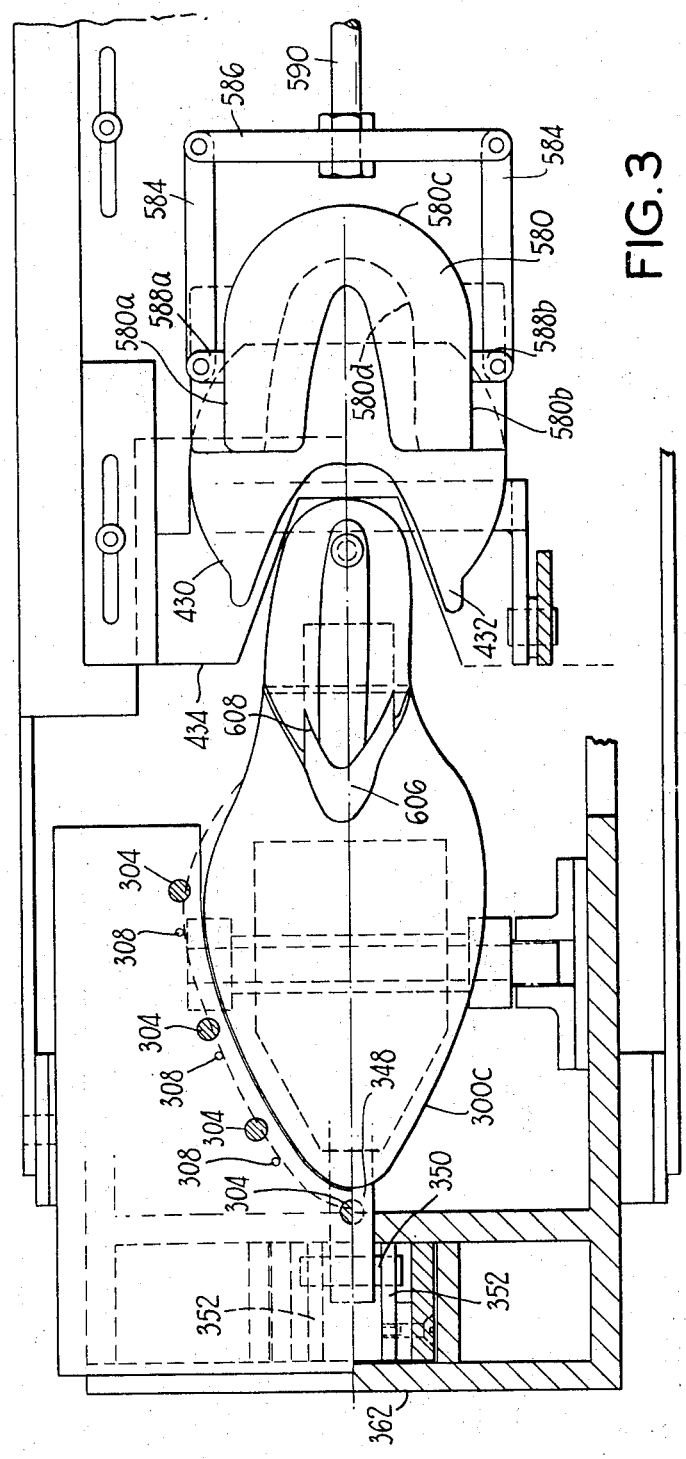

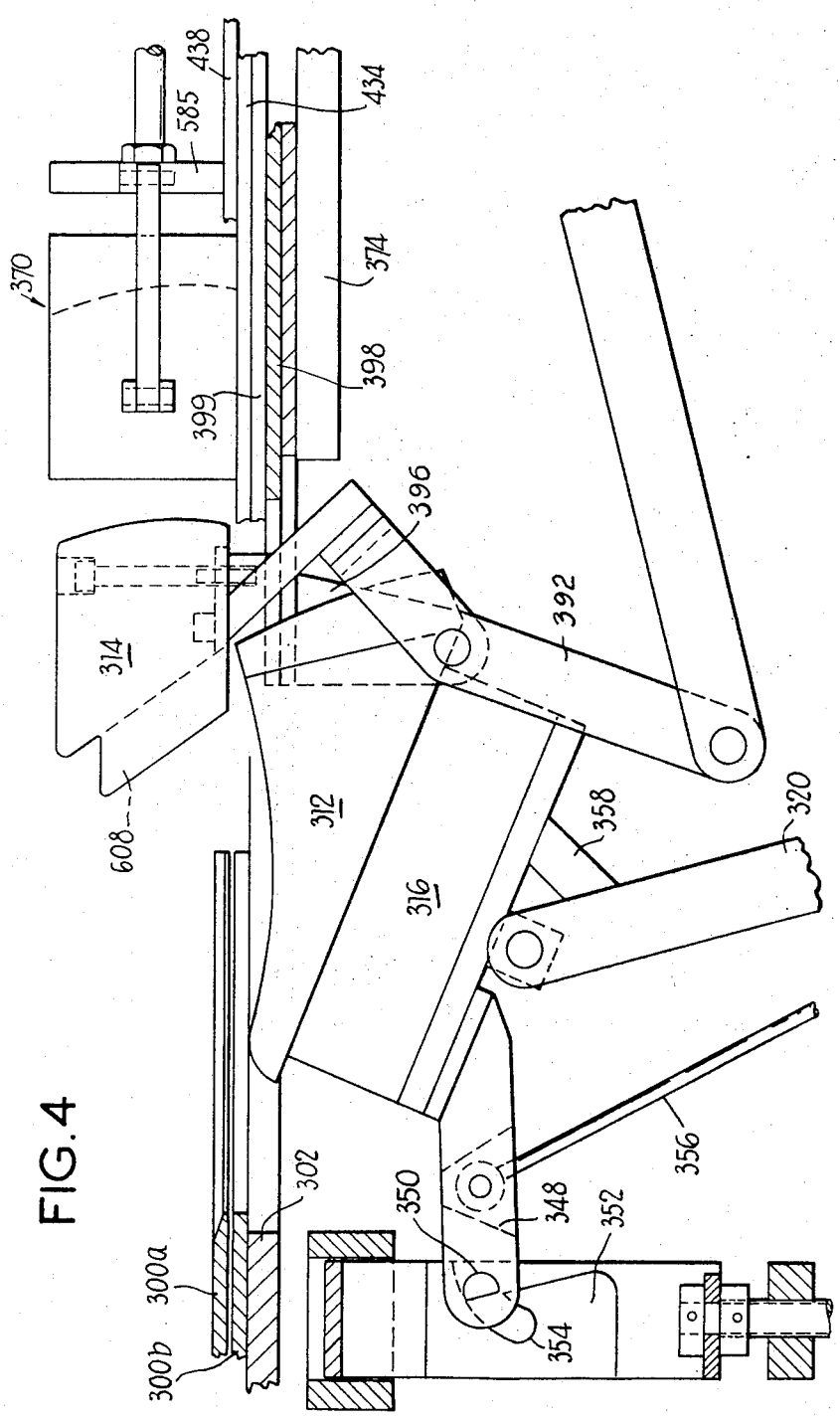

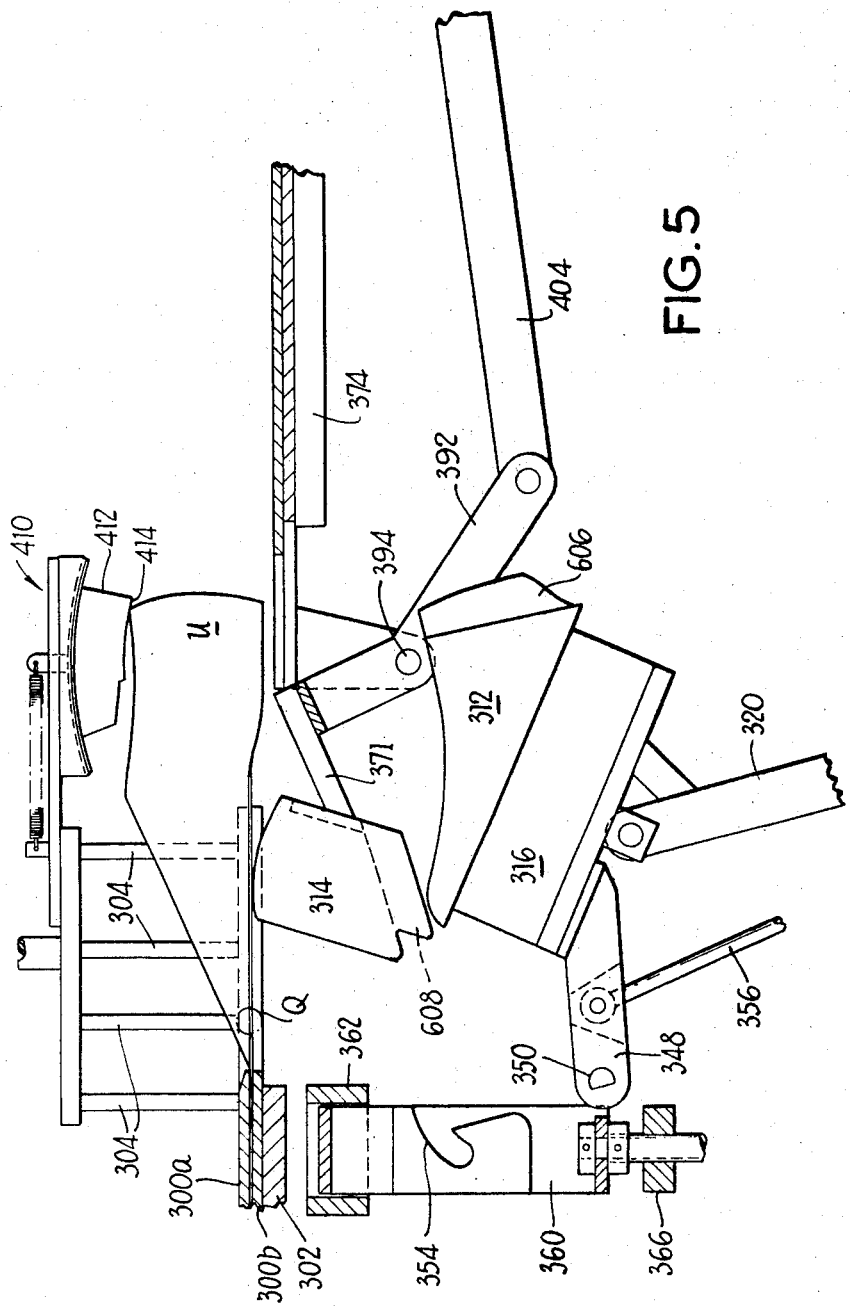

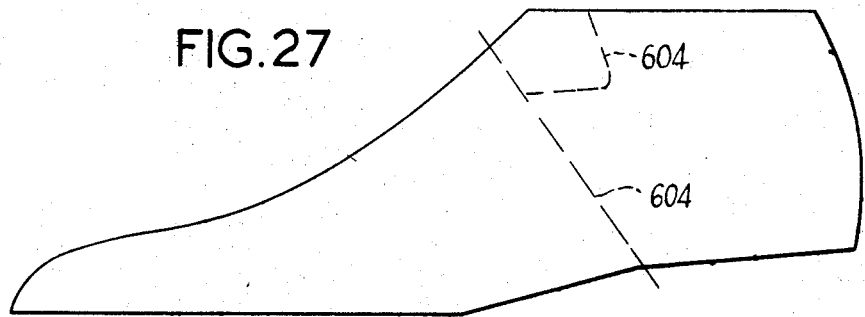
FIG. 27
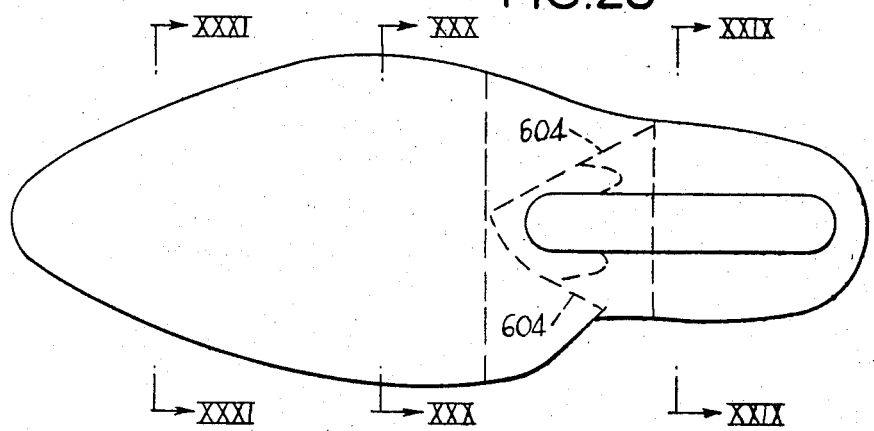
FIG. 28
FIG. 29
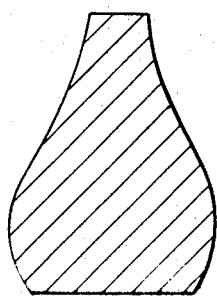
FIG. 30
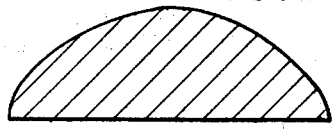
FIG. 31

SHOE MAKING

FIELD OF THE INVENTION

This invention relates to shoe making. The term "shoe" is used herein broadly and is intended to cover any article of footwear.

BACKGROUND

In the conventional mass production shoe making process, the sheets of leather, known as skins, or other upper material with which the process starts are first cut to form the components of the upper. Such components normally comprise of forepart, known as a vamp, and a pair of quarters which eventually form the backpart of the shoe. The operation of cutting these components out of the initial sheets or upper material is known as "clicking." In the next step, known as "closing," the components are joined together, as by stitching, and any additional attachments such as buckles and eyelets for laces are secured to the appropriate components. It will be appreciated that during the closing operation, even though the joined components no longer lie in the flat, all stitching operations are effectively carried out in the flat since essentially no stretching or compression of the upper material to provide the final shape of the shoe has yet taken place.

After the closing operation, the "upper" can be treated to render the upper material stretchable in preparation for the above-mentioned stretching and compression. Such treatment, in the case of leather, involves a moistening of the material, known as mulling, and in the case of the recently introduced poromeric materials, which are synthetic leather-like materials, involves a heating of the material. The treated "upper" is then lasted to produce the abovementioned stretches and compressions. This is conventionally done using a last, which is a form corresponding to the shape of a foot, and requires a high degree of operator skill even when lasting machines, which are complex pieces of apparatus, are used, in order to ensure that the upper is properly brought into conformity with the last. The forming of the backpart of the upper may be carried out on the last, or may be carried out in advance of the lasting operation on a special back forming machine, and in the latter case the lasting operation would essentially only involve the deformation of the forepart of the upper. Conventionally, an insole is attached to the upper during or immediately subsequent to the lasting operation.

The next operation is to relieve the stresses produced during lasting and this may be achieved (dependent upon the type of upper material) by subjecting the lasted upper to a setting operation or simply by leaving the upper on the last for an extended period of time.

In the final step, an outsole is attached to the upper. This may be achieved while the upper is still on the last or the upper, together with the insole attached, may be transferred to the form of foot of an injection moulding machine when the outsole is to be formed by injection moulding.

The above description is not intended to be exhaustive. For example, it will be appreciated that at some stage in the operation a lining will be attached as required, this normally being done during the closing operation, and also stiffeners may be inserted as required, for example in between the mulling and lasting stages.

By way of summary, the essential steps in the conventional shoe making process are carried out in the following sequence:
1. Cutting out the components
2. Closing
3. Rendering stretchable
4. Lasting
5. Setting
6. Attaching outsole In view of the requirement for high operator skill and complicated machinery in carrying out the lasting operation, which complexity and skill is required especially in the form of the forepart, there have been proposed methods and techniques for simplifying the formation of the upper by preshaping the upper forepart component so that the stretching and compression is substantially carried out separately from the operation of bending or wrapping the material into the shape of the last.

British Patent Nos. 1,096,001 and 1,096,002 (The Shoe & Allied Trades Research Association) describe methods for determining the amount of stretch required in the material, and for putting this stretch into the material by a mechanical gripping and pulling operation before conforming the material to the last.

British Patent Specification Nos. 1,102,695 and 1,102,696 (SATRA) describe method and apparatus for carrying out the preshaping operation on upper foreparts using male moulds. The shape of the mould is a development of the shape of forepart of the last, in particular a shape that would be arrived at by forming a sheet of resiliently bendable material, such as unplasticised polyvinyl chloride, to the last shape required and partially flattening out the shell by outwardly displacing the side portions, and this is a preferred method of deriving the shape. During the carrying out of these latter methods, a precut initially flat blank of shoe upper material from which the forepart is to be formed, and which is of course pre-treated to render it stretchable, is held in a clamp or similar restraining device engaging the edges of the material, and the mould is forced into the material to deform it to the required shape. Thus, in this method, the treatment to render the material stretchable and the deformation of the forepart precede the closing operation during which the quarters are attached, and the back forming operation during which the attached quarters are deformed to the required shape. After the backpart has been formed, the upper may be mounted on a last for the purpose of attaching the insole to the upper and for a setting operation, if desired, and thereafter the outsole may be attached in the usual way.

This latter method, therefore, involves a change in the sequence of operations. Whilst the method is capable of producing shoes of high quality, its adoption on a large scale would involve a reorganisation of the shoe factory since shoe factories at present are generally set up to carry out the above listed conventional sequence of operations.

The art of preforming has undergone further development as is fully described in a number of our co-pending patent applications. In the cognate complete specification filed in co-pending U.K. Patent Application Nos. 4864/69, 5076/69, 10625/69, 53625/69, 53628/69, 53629/69 and 60291/69 published as U.K. Specification No. 1,300,931 (Case: J. 4546/4547/4553/4648/4649/4650/4656), there are described in detail male moulds corresponding to the whole area of the shoe upper, and methods of making such moulds, and methods of preforming shoe uppers using the moulds in which vacuum forming techniques are used to cause the shoe upper material to conform to the mould. The cognate complete specification filed in co-pending U.K. Application Nos. 25564/70 and 25565/70 published as U.K. Specification No. 1,307,288 (Case: J. 4553 Div./4656 Div.) describes similar moulds and methods of using them in which mechanical forming operations are used for preforming the shoe uppers. The complete specification filed in co-pending U.K. Application No. 52235/70 (Case: J. 4648 Div. II) describes preforming methods in which the shoe upper material is caused to conform to the moulding surface by the application of super-atmospheric pressure. The provisional and complete specifications filed in co-pending U.K. Application No. 13161/70 (Case : J. 4836) describe an alternative form of the mould which may be used in the methods described in any of the aforesaid co-pending applications.

The methods described in the aforesaid patent applications make it possible to manufacture shoe uppers from a single piece of material and make it possible for the forming of the backpart and forepart to be carried out in a single operation. Nevertheless, it is still necessary to carry out a closing operation after the preforming operation and, whilst there is less closing to do since the upper may be made from a single piece of material, the closing which is done may be somewhat complicated since the seams to be closed will already be in three dimensions. Also, it is necessary in these methods to carry out some final cutting out operations after preforming and these may be complicated because, again, by this time the material is in three dimensional form.

With a view to reducing to a minimum the cutting out and closing operations which have to be preformed in three dimensions after preforming, certain methods of preparation of blanks have been devised, and preforming methods using them, as described in co-pending U.K. Application Nos. 56676/70 (Case: J. 10172) and 57146/70 (Case: J. 10173). Specific methods and apparatus for preforming, which are particularly suitable for use with the blanks prepared in accordance with Application Nos. 56676/70 and 57146/70 are described in the provisional and complete specifications filed in co-pending U.K. Application Nos. 8474/71 and 14502/71 (Case: J. 10202).

With these last mentioned methods it has been possible to virtually eliminate final cutting out operations in three dimensions but nevertheless there has still remained at least one seam, normally the back seam, which has to be close in three dimensions. Thus, the preforming steps in the sequence of operations for making a shoe utilising these latter mentioned methods, follow a part closing operation and precede a final closing operation. Accordingly, whilst these methods may produce shoes of high quality at reasonable costs, they still involve a change in the conventional sequence.

All of the above mentioned patents and applications are in the name of Shoe and Allied Trades Research Association, the same assignees as in the present application. Attempts have been made to simplify the shoe making process by other workers in the art. For example, U.S. Pat. No. 3,355,535 (Hain et al.) discloses a process which attempts to reduce the upper formation to a single step. This process uses matched male and female dies, the male die being used to force into the female die a sheet of shoe upper material which is held in a clamp and, preparatory to the forming operation, extends across the opening of the female die. To facilitate the forming operation, the dies correspond in shape to an upper whose normally re-entrant waist portion has been reversed so that there are no re-entrant portions in the dies. In fact, this process does not result in a shoe upper formed in a single step since after the forming operation it is necessary to carry out cutting operations and also further operations, particularly the attachment of ancillary components such as buckles and the stitching of margin portions to form a folded over top line margin, normally carried out in the closing room. Hence, both closing and cutting operations have to be carried out after the forming operation.

U.S. Pat. No. 2,904,838 (Phillips) discloses another attempt in the prior art to simplify shoe making. In this disclosure, thermoplastic material is forced into a female mould whose surface is patterned for reproducing the required characteristics and features of the upper to be formed. While the material is in the mould, it is heated so that it flows in order to conform with the moulding surface. After the formed upper has set, it is removed from the mould and then the final operations, including both cutting out and closing operations are performed. This method is only suitable for thermoplastic material which can be heated to a degree that it can flow. There is no stretching of the material as it is moved into the mould but rather the material would crumple when forced in. Thus, the method is unsuitable for use with leathers, which are not thermoplastic, or with the recently introduced poromeric shoe upper materials which, although thermoplastic, would have their unique leather-like characteristics, including porosity, destroyed if heated to the extent required by Phillips.

U.S. Pat. No. 1,791,059 (Hubbard) discloses a lasting machine having a clamp for the blank to be formed into an upper and a mechanism for receiving a last having an insole tacked thereto and for moving said last through the clamp so as to attempt to cause the upper material to conform to the last. The movement is vertical with respect to the last. This simple vertical movement which the last undergoes is not adequate for satisfactorily forming the backpart and the forepart. For example, excessive stretching of the material, especially at the toe region, is likely to take place.

British Patent Specification No. 907,745 proposes a forming machine for uppers. This comprises a toe former and a heel former which can operate simultaneously. However, there is no suggestion of any means for forming the whole of the upper, in particular there is no means suggested for forming the waist and adjacent regions of the upper. Thus, after the toe and heel have been formed utilising the apparatus of British Patent Specification No. 907,745 it would be necessary to transfer the partially formed upper to a last to complete the forming process in the usual way. Further the toe former in British Patent Specification No. 907,745 incorporates a mechanism for maintaining the toe mould level relative to the shoe upper and, as will be understood from a careful consideration of the detailed description of the present invention to follow, this is not the ideal motion for forming the toe of an upper.

The provisional and complete specifications filed in our co-pending U.K. Application No. 57354/71 (Case: J. 10645), The Shoe and Allied Trades Research Association, the entire contents of which application are hereby incorporated herein by reference, describes moulds, methods and apparatus for preforming in which the difficulties discussed above may be substantially alleviated.

THE INVENTION

The present invention concerns further developments and improvements in this art.

In one aspect, the present invention provides a mould for use in preforming shoe uppers, which comprises a plurality of parts which are separable, but which together define a moulding surface corresponding to the whole surface of the shoe upper, said moulding surface being such that a wholly closed upper may be preformed therewith. That is to say, all closing operations may be completed before the preforming operation.

In a further aspect, the present invention provides a mould for preforming shoe uppers, said mould including a mould forepart and a mould backpart which are separate from one another but which, when placed in a predetermined relationship, define a moulding surface corresponding to the whole of the shoe upper, said moulding surface being continuous along at least one line extending from one side around the heel to the other side.

In a further aspect, the present invention provides a method of making shoe uppers, in which a plurality of mould parts are moved in succession into a shoe upper, said mould parts together defining a moulding surface corresponding to the whole of the shoe upper, said upper being caused to conform to said moulding surface so as to deform the shoe upper into the required shape.

In a further aspect, the present invention provides apparatus for preforming shoe uppers comprising means for supporting an upper to be formed, and means for moving a plurality of mould parts in succession into engagement with the shoe upper to deform it to the required shape. Preferably, the mould parts fit together to form a moulding surface corresponding to the whole of the shoe upper.

Preferably the moulding surface is a development of the shape of the last to which the upper corresponds. In a particularly preferred embodiment, the heel portion of the moulding surface is of the same shape as the last whereas the waist and/or forepart portions are a development of the shape of the last.

Utilising the present invention, since the forepart and backpart moulds are separate by nevertheless define a moulding surface corresponding to the whole of the upper, both the heel region and the toe region can be properly formed since the motions executed by the forepart and backpart moulds may be independently selected to be optimum for achieving the required forming, and the region of the shoe between the toe and heel regions may also be properly formed since the moulding surface corresponds to the whole of the upper.

The upper may be subjected to a setting operation while it is still in the apparatus of the present invention and, accordingly, all that is necessary thereafter is to transfer the upper to a suitable form, for example the foot of an injection moulding machine or to a last, for assembly with the remaining parts of the shoe, in particular the sole. It should be understood that when the preformed upper is transferred to a last for this assembly, essentially the only operation necessary to make it to conform to the last is a bending operation, the stretching and compression having been effected during the preforming operation.

In a further aspect, the present invention provides a mould for preforming shoe uppers, in which heat insulation is provided between a forepart portion and a backpart portion. Thus, when a leather upper having a thermoplastic stiffener in the backpart is made, the leather of the forepart may be set by heating and, the backpart having been preheated to soften the thermoplastic stiffener, when the moulding operation is complete the thermoplastic stiffener can be set by cooling the backpart mould.

THE DRAWINGS

The invention is described further by way of example with reference to the accompanying drawings, in which:

FIG. 2 is a section on the line II — II of FIG. 1 also with certain parts omitted;

FIG. 3 is a plan view partly in section of the apparatus of FIGS. 1 and 2 also with certain parts omitted;

FIG. 4 is a side view of the portion of the apparatus of FIG. 1 but showing the parts in a different position to that shown in FIG. 1;

FIG. 5 is another side view of the portion of the apparatus shown in FIG. 4 but with the parts in yet another position and also showing diagrammatically an as yet unformed upper located in the machine in preparation for the preforming operation;

FIG. 7 is a view on the arrow VII of FIG. 6;

FIGS. 27 and 28 are respectively side and plan views of the mould of FIG. 20 in an intermediate stage of preparation;

FIGS. 29 to 31 are sections on the correspondingly numbered lines of FIG. 28.

Figure 1:
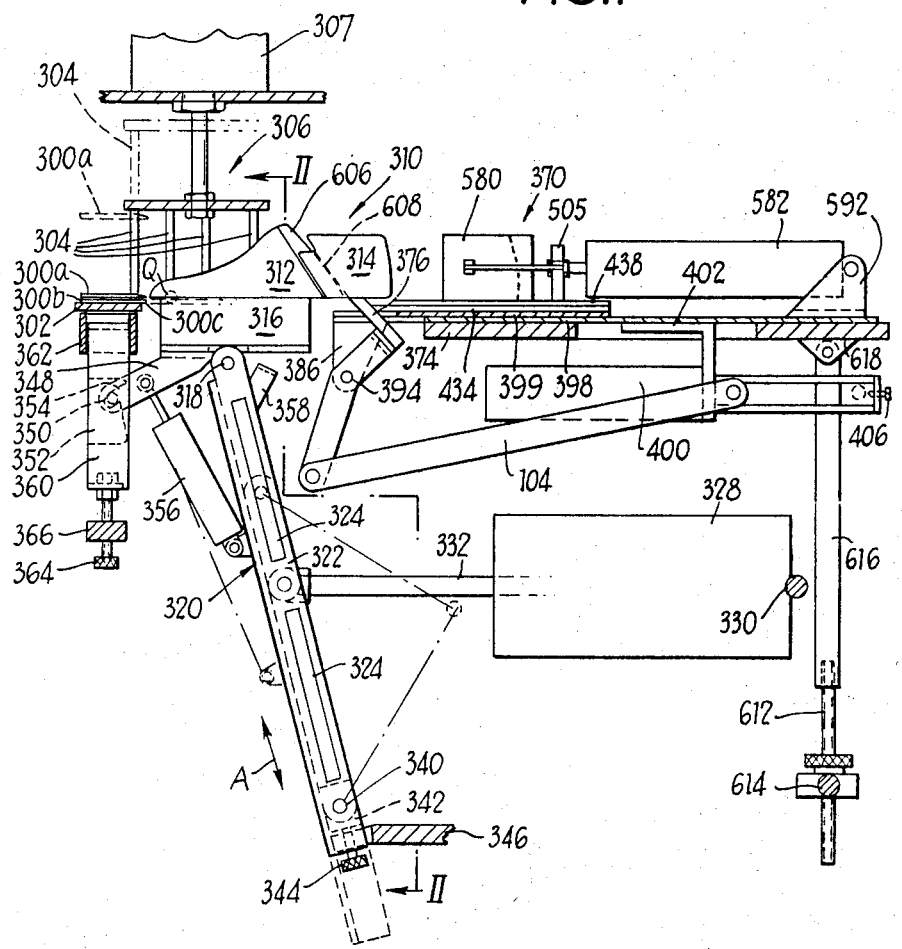
FIG. 1 is a side view, partly in section, of apparatus according to an embodiment of the invention, with a number of parts omitted for clarity.

The apparatus shown in the accompanying drawings comprises a pair of clamping plates 300a and 300b for securely gripping the lasting margin of the forepart of an upper to be preformed in the apparatus. The lower plate 300b is fixed to a support 302 and the upper plate 300a is secured to pins 304 which are at equispaced positions around the edge portion 300c of the clamping plates defining an opening in which the upper is located when held in the clamping plates. The pins 304 are carried on a support 306 which is connected to an actuator 307 for raising and lowering the support 306 so that the clamping plate 300a can be moved between the clamping position shown in full lines in the drawings and the raised position shown in broken lines in FIG. 1. When the clamping plate is in the raised position, the upper to be formed can be mounted in the machine. To ensure the correct positioning of the upper on the lower clamping plate 300a, locators 308 are mounted on the lower plate 300b at positions spaced inwardly from the edge 300c a distance approximately equal to the width of the lasting margin of the upper to be formed. The upper plate 300a is formed with openings which receive the locators 308 when the plates 300a and 300b are in the clamping position so that the locators 308 do not interfere with the clamping action.

A mould 310 for preforming shoe uppers mounted in the clamp 300 is formed in two parts, namely a mould forepart 312 and a mould backpart 314. The mould parts 312 and 314 are movable to and from their forming positions individually. When the two mould parts 312 and 314 are in their forming positions they together define a moulding surface which corresponds substantially to the whole of the upper to be formed and which is substantially continuous. It should be understood, However, that there may be a slight discontinuity or gap in the moulding surface, for example due to manufacturing tolerances, at the junction between the forepart and backpart moulds. Such gap may for example be about three-eighths or one-half inch. The expression "substantially continuous" should therefore be understood in this context.

The embodiment of the invention illustrated in the drawings is specifically intended for performing uppers which are made of leather but include in the backpart a thermoplastic stiffener. The major deformations which take place in the leather are in the forepart and since such deformations may be set by heat treatment, the mould forepart 312 is heated. For this purpose, the mould forepart 312 is mounted on a heater 316 which may be in the form of a block of iron containing electrical resistance heaters. To ensure adequate conduction of heat, the mould forepart 312 is preferably solid metal, such as aluminum. To enable different types or styles of shoe to be formed in the apparatus, the mould 310 is removable. Thus, the mould forepart 312 is removably mounted on the heater 316.

The heater 316 is pivotally mounted at 318 on the upper end of a slide 320 which is reciprocable in the direction of the arrows A. The slide 320 is in the form of a channel-section member having on its opposite sides 322 lugs 324 slideably engaged in guides 326 which are fixed to the frame of the machine. The mechanism for reciprocating the slide 320 comprises an actuator 328 pivoted at 330 to the frame of the machine and having a connecting rod 332 pivoted to the mutual pivot points 334 of a pair of toggle levers 336 and 338, the upper 336 of which has its upper end 336a connected to the slide 320 at the pivot point 318 and the lower 338 of which has its lower end pivotally connected at 340 to a block 342 which is secured by an adjustment screw 334 to a portion 346 of the frame of the machine. Adjustment of the screw 344 varies the uppermost and lowermost positions of the slide 320 and therefore the mould forepart 312.

The movement which the mould forepart 312 executes when it is raised to its moulding position, from its lowered position, is important. In particular, in this embodiment, it is desired that the mould forepart 312 should move upwardly into the upper to be preformed in an attitude in which the toe end of the mould forepart 312 is raised so that the toe end comes into contact first with the upper. Thereafter, it is desired that the mould 312 should pivot, as it is moved up into its final position, to assume the horizontal position shown in FIG. 1. In this way, the material of the upper is "stroked" towards the toe region at which the deformations are most severe, and this movement assists in avoiding cracking of the surface of the shoe upper material.

This motion of the mould forepart 312 is achieved by means of an arm 348 fixed to the heater block 316 and carrying at its free end a transversely extending pin 350 engagable with a pair of cams 352 each having a cam slot 354 for receiving the pin 350. An actuator 356, which may simply contain a suitable spring, is connected between the arm 348 and the slide 320 and urges the forepart mould 312 in the clockwise direction towards the position shown in FIG. 4, in which the underside of the heater block 316 engages a stop 358 also carried by the slide 320. The arrangement is such that as the mould forepart 312 is raised from its lowermost position shown in FIG. 5, the underside of the heater block 316 remains in contact with the stop 358 during the initial part of the movement, namely until the intermediate position shown in FIG. 4 is reached in which the pin 350 engages the cams 352. Thereafter, the mould forepart 312 begins to pivot in the anticlockwise direction, and the pin 350 slides into the cam slots 354. The rate of pivoting of the mould forepart 312 depends upon the shape of the slots 354. The cams 352 are carried on an adjustable support structure 360 whose upper end is slideable vertically in a box-like guide 362 and whose lower end is connected by an adjusting screw 364 to a fixed portion 366 of the frame of the machine. This adjustment enables it to be arranged that the mould forepart 312 ends up in the required position relative to the clamp 300, which required position is normally that the flat base of the mould forepart 312 should be in the same plane as the clamp 300.

The instrumentalities for forming the backpart of the upper include the mould backpart 314, a heel former 370 for pressing the backpart of the upper into close conformity with the mould backpart 314 and a wiper mechanism 372 (not shown in FIG. 1) for wiping the lasting margin of the backpart of the shoe underneath the base of the mould backpart 314, and all these instrumentalities are carried on a common support 374.

Figure 8:
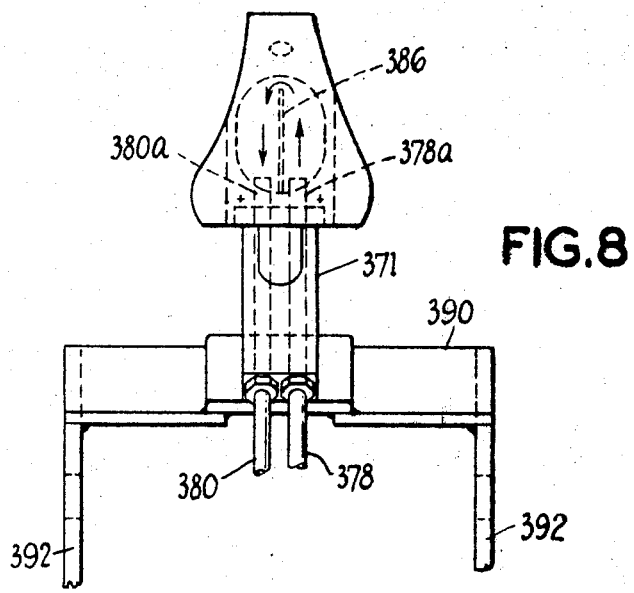
FIGS. 8 and 9 show further details of the apparatus not visible on FIGS. 1 to 7 being respectively end and side views of the portion of the apparatus shown.

The mould backpart 314 is removably mounted on an arm 376, so that it can be exchanged with moulds of other design, and the arm 376 also carries inlet and outlet pipes 378, 380 respectively for coolant. The pipes 378 and 380 terminate in nipples 378a, 380a which engage in corresponding openings in the mould backpart 314 and which carry O rings 382 for forming a liquid tight seal between the nipples and the openings. The interior of the mould backpart 314 contains a cavity 384 having a partition 386 therein. The nipples 378a and 380a communicate respectively with the portions of the cavity 384 on opposite sides of the partition 386 so that coolant introduced through the pipe 378 flows into and around the cavity 384, and out of the pipe 380 in the manner shown by the arrows in FIG. 8. The purpose of this arrangement is to set the thermoplastic stiffener referred to above in the required shape of the backpart of the upper by cooling the stiffener while the upper is conformed to the mould.

Figure 9:
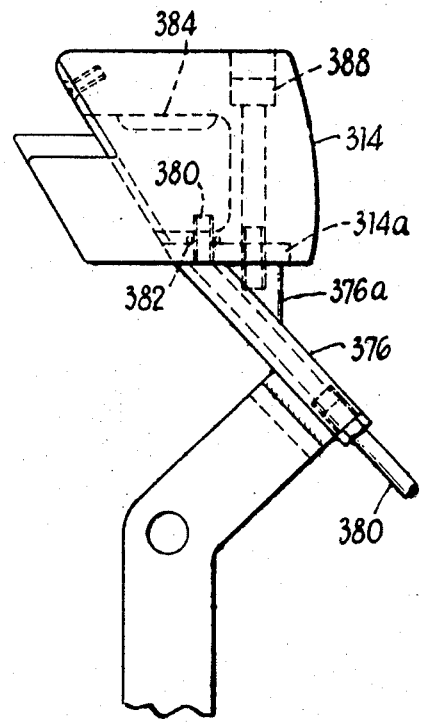

The mould backpart 314 contains a recess 314a in its base which fits over a shoe 376a provided on the arm 376 for correctly locating the mould backpart 314 in position, and the mould backpart 314 is secured to the arm 376 by means of a screw 388 (FIG. 9).

The arm 376 is carried on a bridge member 390 connected at its opposite ends of a pair of levers 392 which are themselves pivoted at 394 intermediate their ends to a pair of ears 396 secured to a plate 398 at opposite sides of the machine, the plate 398 being in turn mounted upon the support 374. The raising and lowering of the mould backpart 314 is effected by an actuator 400 adjustably mounted at 402 on the plate 398 and connected by a pair of links 404 to the levers 392. The stroke of the actuator 400 is adjustable by an adjustable stop 406.

As can be seen from FIGS. 4 and 5, when the mould forepart 312 is in its lower or intermediate position it extends to some extent inbetween the levers 392. Accordingly, the arrangement comprising the bridge 390 and levers 392 for supporting the mould backpart 314 is such that there is no interference with the movement of the mould forepart 312.

Figure 6:
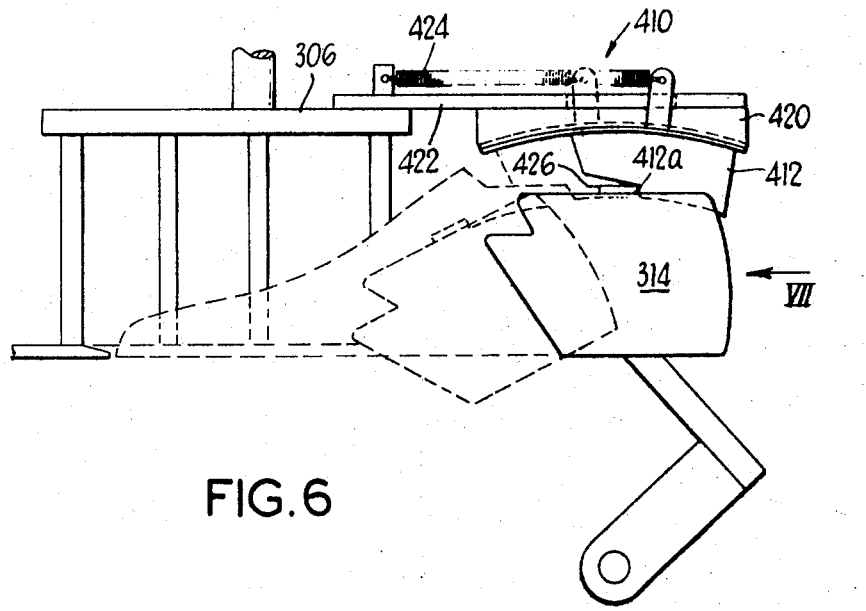
FIG. 6 is a side view of a part of the apparatus of FIG. 1 illustrating certain features not shown on FIGS. 1 and 5.

When the machine is operated to preform an upper, the mould backpart 314 is raised, before the mould forepart 312, from its position shown in FIG. 5 to that shown in FIG. 4. During this movement of the mould backpart 314, it could happen that the backpart of the upper held in the clamp in preparation for the preforming operation would be caused to be raised as the mould backpart 314 moves into the upper. Such a raising of the backpart of the upper could result in misalignment between the backpart of the upper and the mould backpart 314 which in turn could result in the production of an improperly shaped upper. To prevent this happening, a heel height gauge 410 is provided (FIGS. 5, 6 and 7). The heel height gauge 410 comprises a downwardly projecting blade 412 having a lower edge 414 which engages the upper edge of the heel portion of the shoe upper. The blade 412 is mounted for movement along an arc concentric with the pivot point 394 by means of arcuate flanges 416 attached to the upper edge of the blade 412 and slideable in arcuate channels 418 provided in a support 420 which in turn is carried on the end of an arm 422 supported on the support structure 306. A tension spring 424 urges the blade 412 to the left as seen in FIGS. 5 and 6. The blade 412 is formed with a shoulder 412a which is engagable by a cross bar 426 provided on the top of the mould backpart 314. The top of the mould backpart 314 is slotted at 428 to receive the lower portion of the blade 412. The arrangement is such that, as the mould backpart 314 is raised, the backpart of the upper is held down by the blade 412 and as the mould 314 moves upwardly and backwardly into the final position shown in FIG. 6 in full lines, at which time the heel of the upper is also forced backwardly by the movement of the mould backpart 314, the cross bar 426 engages the shoulder 412a thus moving the blade 412 backwardly along with the mould backpart 314 so that relative movement between the blade 412 and the heel of the upper is avoided. Such relative movement would be undesirable since it could mar the surface of the upper to be formed.

The wiper mechanism comprises a pair of wiper blades 430 and 432 which are made of rigid metal plate and include arcuate outer edges 430a, 432a respectively and straight inner edges 430b and 432b. The blades 430 and 432 are slideably supported on a support member 434 and are reciprocable in the direction of the arrow B. Side guide strips 436 and 438 which are in contact with the arcuate surfaces 430a and 432a ensure that during reciprocation of the blades they move in the required straight line parallel to the arrow B. The support 434 is a plate which is mounted in turn upon the plate 399 and the guide strips are mounted on packing 440 on the plate 399 so as to be held in alignment with the blades 430 and 432. The guide strips 438 are thus spaced from the plate 399. The packing 440 beneath the guide strip 438 is discontinuous so that there is an open space 442 between the guide strip 438 and the plate 399. There is a similar open space 438 and the plate 399. There is a similar open space beneath the guide strip 436. The mechanism for effecting reciprocation of the wiper blades 430, 432 comprises a lever 444 having one end pivoted at 446 to the plate 399 and the other end 448 extending through the space 442 and preferably coupled to an actuator (not shown) for effecting pivotal movement of the lever 444 about the pivot 446. The lever 444 is also pivotally connected at 450 to a slide block 452 which is slideable in a rectangular opening 454 in the plate 399. The slide block is connected by links 456 and 458 to the blades 430 and 432 respectively, the connection between the links and both the blades and the slide block being pivotal.

Rollers 460 and 462 are mounted on the support 434 and are arranged to be engaged by the arcuate surfaces 430a and 432a respectively when the wiper blades are advanced to the left. These rollers cause the blades to rotate inwardly beneath the mould backpart to the positions shown in dotted lines in FIG. 10 for wiping the lasting margin of the backpart of the upper beneath the mould backpart.

The support plate 434 is substantially rigid so that as the wipers engage the lasting margin of the upper, they cannot be forced downwardly. Also, to assist in maintaining the wiper blades 430 and 432 flat on the support plate 434, cap plates 470 are mounted on each of the guide strips 436 and 438 and extend over the edges of the wiper blades 430 and 432 while the blades are executing their rotary motion. To assist in ensuring proper guiding of the blades 430 and 432, pivot pins 456a and 458a by which the links 456 and 458 are connected to the blades engage in slots 434a formed in the support plate 434.

Figure 10:
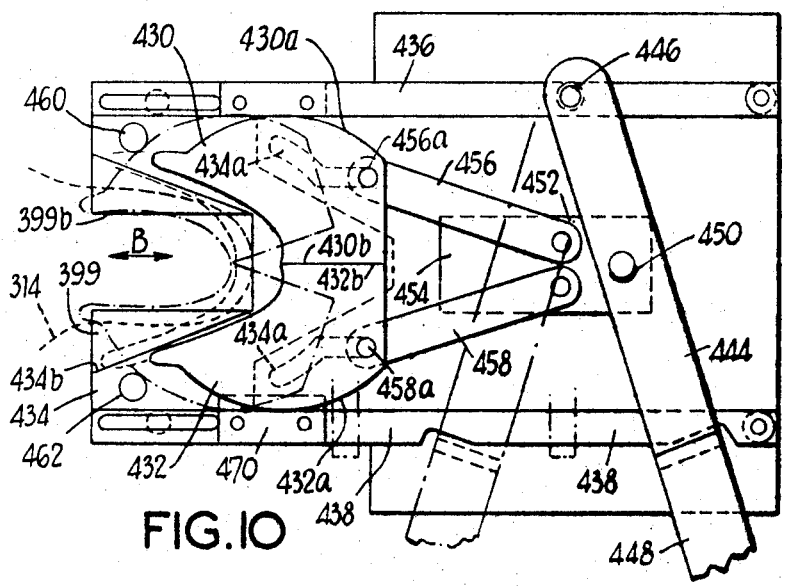
FIG. 10 is a plan view of a portion of the apparatus showing detail not illustrated in FIG. 3.
Figure 10A:
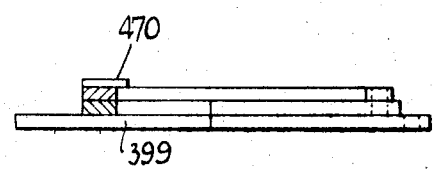
FIGS. 10A and 10B are respectively end and side views of the portion of the apparatus shown in FIG. 10.
Figure 10B:
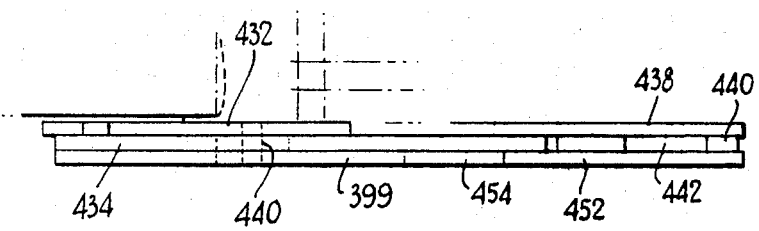

The position of the lower edge of the mould backpart 314 relative to the wiper mechanism is shown in broken lines in FIG. 10. FIG. 10 also shows that there is an opening defined by the edge 434b of the plate 434 at the left hand end and a corresponding opening, but of different cross section, defined by the edge 399b of the plate 399. The plate 399 is mounted on the plate 398 and is adjustable in the direction of the arrow B thereon.

The heel former 370 comprises a pressure member 580 which is adapted to fit around the backpart of the upper and press it into close engagement with the surface of the mould backpart 314. The pressure member 580 is made of a flexible mouldable material having a sufficient degree of hardness to provide the necessary pressure. Suitable materials are silicon rubber or expanded polyurethane. Side portions 580a and 580b may be reinforced to render them relatively rigid, as by providing metal side walls, but the curved end portion 580c should be flexible to enable the pressure member 580 to flex into the required engagement. The inside surface 580d of the pressure member 580 is moulded into the same shape as the moulding surface of the mould backpart 314 but is slightly larger to accommodate the thickness of the shoe upper material. The pressure member 580 is connected to an actuator 582 by means of a pair of pivotal links 584 each pivoted at one end to a cross bar 586 and at the other end to an ear 588a or 588b attached to the side portions 580a and 580b respectively. The cross bar 586 is fixed to the push rod 590 of the actuator 582. A pair of sliders 585 rest on top of the guide strips 436 and 438 and are slideable therealong. At its rear end, the actuator 582 is pivoted to a bracket 592 which is fixed upon the plate 398. The sliders 585 thus support the heel former in the required position. However, for access to the wiper mechanism, the heel former 370 comprising the pressure member 580 and the actuator 582 can be pivoted as a unit relative to the bracket 592 up and away from the wiper mechanism.

When making shoes using the apparatus described with reference to the drawings, the normal clicking and closing operations are carried out in their usual sequence and the fully closed upper is subjected to a conventional treatement for rendering it stretchable. In the case of leather, this may be a mulling treatment and, in the specific case under consideration, the leather will be mulled and heated so that the thermoplastic stiffener in the heel will be softened. The upper is then placed in the correct position on the lower clamp plate 300b as defined by the locators thereon, while the upper clamp plate 300a is raised and the mould forepart and backpart are in their lowered positions, the wiper mechanism and the heel former also being retracted at this time. The upper may be placed in the apparatus manually. The wholly-closed but as yet unpreformed upper is shown in position at U in FIG. 5.

The actuator 307 is then energised to lower the clamp plate 300a into the position shown in FIG. 1 so that the lasting margin of the forepart of the upper is securely gripped in the clamp. Next, the actuator 400 is energised so that the backpart mould 314 is raised. Thereafter, the actuator 328 is energised to raise the mould forepart 312, which initially moves in an upwardly tilted attitude and then pivots under control of the cam 352 until finally it assumes the position shown in FIG. 1. The actuator 582 is then energised to bring the pressure member 580 into engagement with the heel part of the upper so as to cause this to closely conform to the surface of the mould backpart 314 and thereafter the wiper mechanism is operated to wipe the lasting margin of the backpart of the upper underneath the mould backpart 314. Since the mould forepart is heated, the deformations produced in the forepart of the upper when the mould forepart is raised will be set, and since the mould backpart 314 is cooled, the thermoplastic stiffener will be set. After a time sufficient for these setting operations to take place, the actuators may be energised in reverse order and in the reverse direction to enable the preformed upper to be removed from the machine.

It may be then transferred to a last for attachment of the insole and outsole or directly to the form of an injection moulding machine for attachment of the sole.

Figure 11:
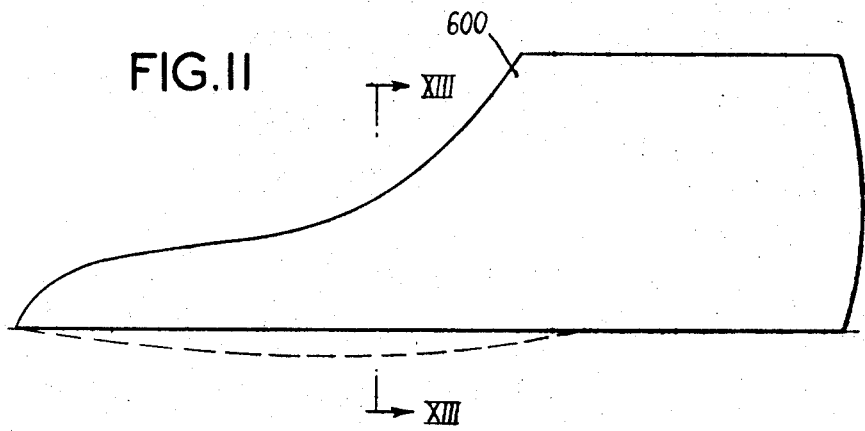
FIGS. 11 and 12 are respectively side and plan views of a shell from which the mould shape is derived.
Figure 12:
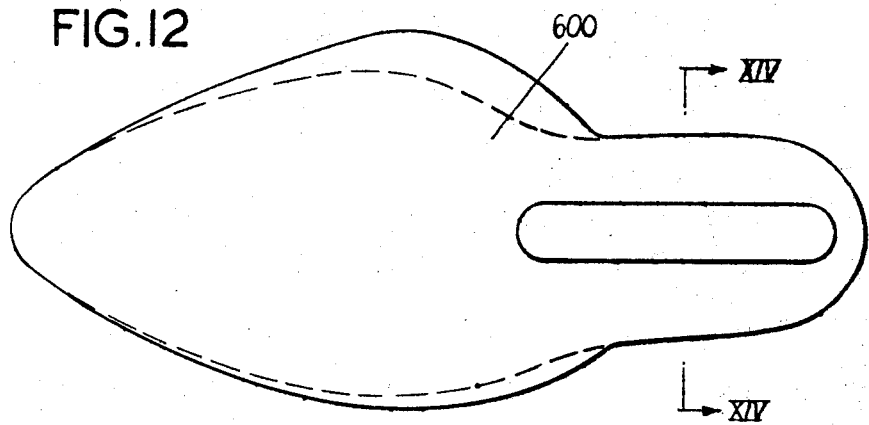
Figure 13:
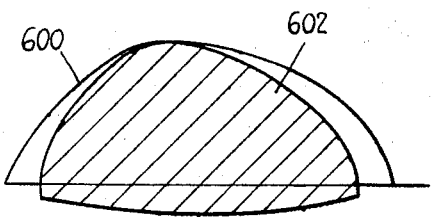
FIGS. 13 and 14 are sections on the lines XIII — XIII and XIV — XIV of FIGS. 11 and 12 respectively.
Figure 14:
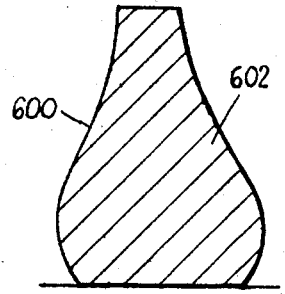
Figure 15:
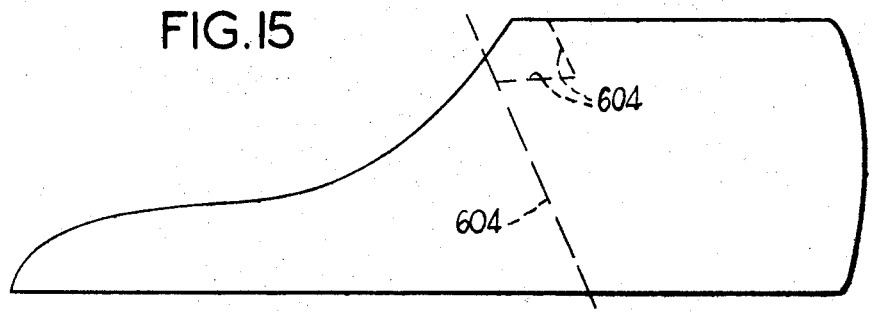
FIGS. 15 and 16 are respectively side and plan views of the mould in an intermediate stage of preparation.
Figure 16:
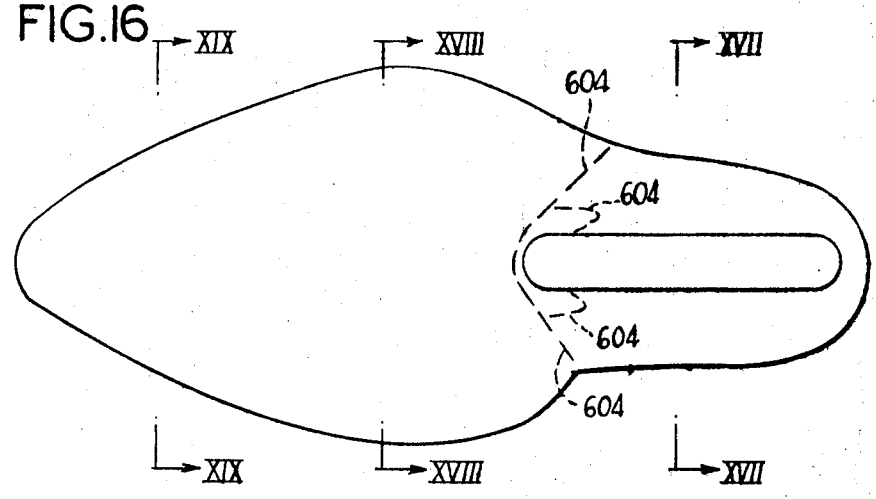
Figure 17:
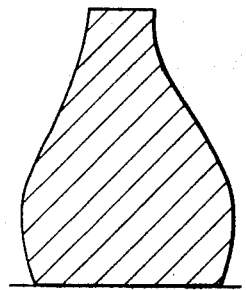
FIGS. 17, 18 and 19 are respectively sections on the lines XVII — XVII, XVIII — XVIII and XIX — XIX of FIG. 16.
Figure 18:
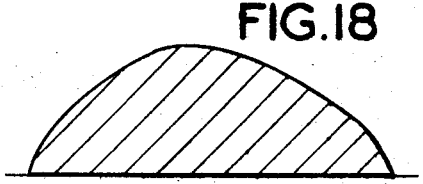
Figure 19:

In the mould to be described with reference to FIGS. 11 to 19, the heel portion of the moulding surface is precisely, or at least almost precisely, the same shape as the heel portion of the last. The forepart and waist portions, however, are a development of the last shape, which development involves a spreading out of the last shape, which spreading out is accompanied by some degree of flattening. FIGS. 11 and 12 illustrate a shell of resiliently flexible material, such as unplasticised PVC, which has been conformed to the last corresponding to the shoe to be made and thereafter spread out in the required manner. In FIGS. 11 and 12 of the accompanying drawings, the shell is indicated by the reference number 600. The broken lines indicate the approximate natural position of the edge of the shell, corresponding to the feather edge of the last, and the full lines indicate the position of the edge of the shell which is required, the position being such that the whole of the edge of the shell lies in a single plane. However, as is indicated by the fact that the broken lines in FIGS. 11 and 12 appear only around the waist regions and the forepart regions, there is no change in the edge of the shell in the backpart. FIGS. 13 and 14 are sectional views illustrating the required shape of the shell relative to the last. As seen in FIG. 13, the side portions of the shell are spread out in the forepart region resulting in a partial flattening. However, as seen in FIGS. 14, in the heel region, the shell remains the same shape as the last.

After the shell has been suitably deformed to the required shape, a mould may be derived from it by conventional techniques. First, a single mould may be derived as shown in FIGS. 15 to 19, and this may be made of metal. After this mould has been made, it may be sawn along the lines 604 to separate the forepart from the backpart. Thereafter, a central ridge 606 is attached to the forepart (FIGS. 1 and 3) and a channel 608 corresponding to the ridge 606 milled in the backpart so that the forepart and backpart mould portions may interlock as shown in FIG. 1 when they are brought to their raised positions. The result is a mould in two parts which, when brought together to the moulding position, form a mould corresponding to the whole of the upper of the shoe with no discontinuities therein in the sense that a fully closed upper may be conformed to the mould as distinct from a partially closed upper in which one seam, for example the back seam, has not yet been closed.

Figure 21:
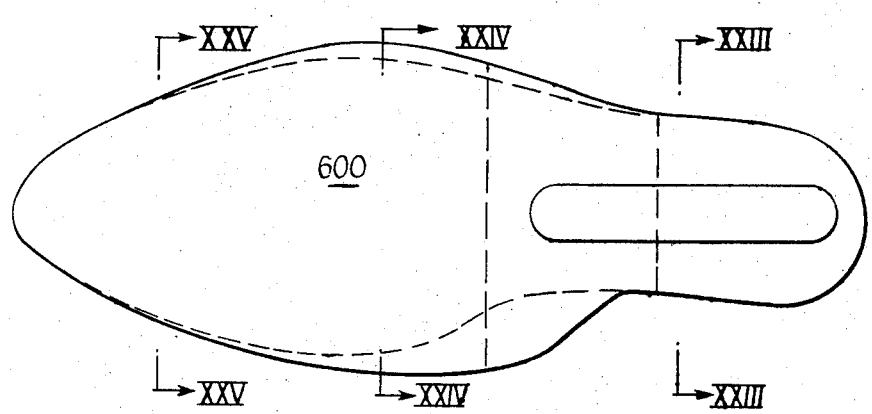
FIGS. 21 and 22 are respectively plan and side views of a shell used in deriving the mould shape of FIG. 20.
Figure 22:
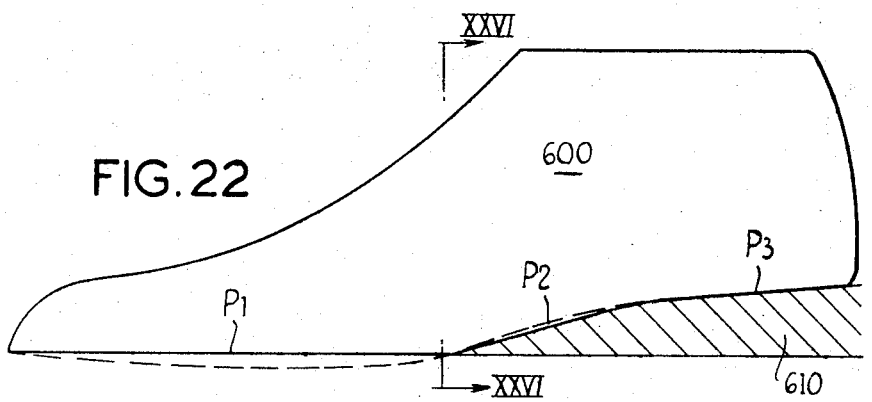
Figure 23:
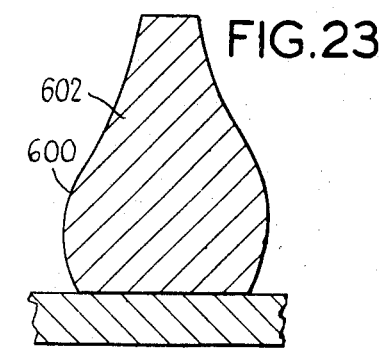
FIGS. 23 to 26 are sections on the correspondingly numbered lines of FIGS. 21 and 22.
Figure 25:
Figure 24:
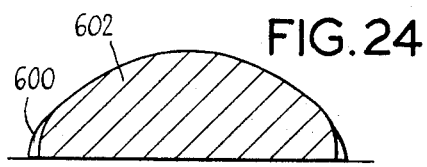
Figure 26:
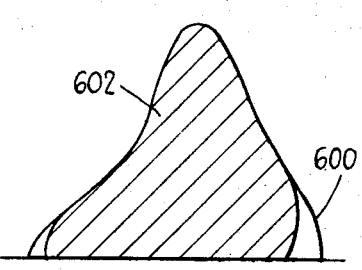

It may be found in bringing the edge portion of the shell 600, in the forepart region, into a single plane, the heel tends to be raised. This may arise with certain types of last. In this case, the shell can be spread out in such a way that the edge at different portions is located in different planes. A typical arrangement is shown in FIGS. 21 and 22 in which the shell is found to be such that it can be spread out readily into a total of three planes indicated as P1, P2, and P3. In this case, a wedge 610 is provided to assist in the proper spreading out of the shell. As in the case of FIGS. 11 to 19, the heel portion of the shell 600 is retained in the last shape, but the waist regions and the forepart regions are spread out. The relationship between the shell and the last at various places can be seen from FIGS. 23 to 26.

A mould is then derived from the shell as illustrated in FIGS. 27 to 31. This mould is then sawn in a manner similar to the mould of FIGS. 11 to 19 to make a two part mould as shown in FIG. 20.

Figure 20:
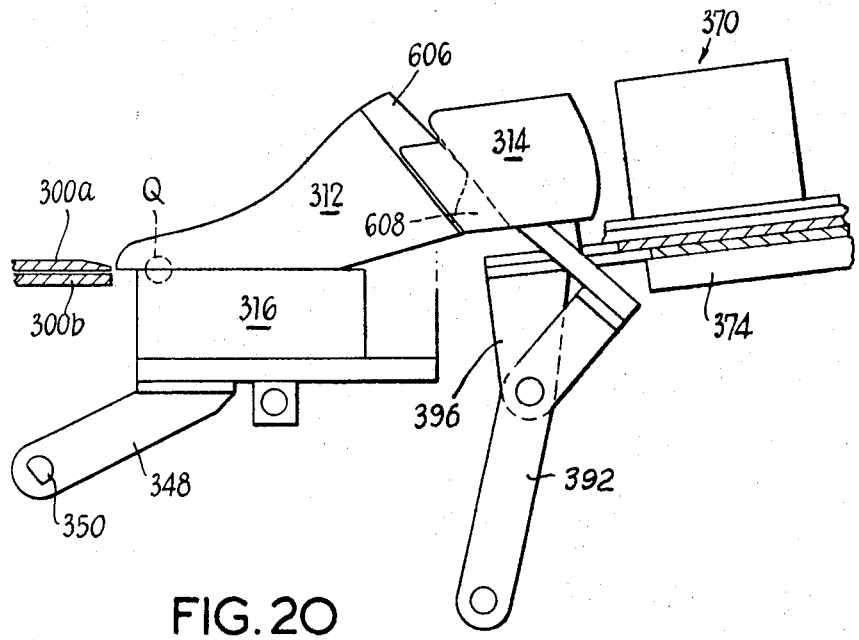
FIG. 20 is a partial side view of the apparatus of FIG. 1 in which an alternative form of mould is utilised.

In order that a mould with a raised heel portion as shown in FIG. 20 may be used in the apparatus, the plate 374 which supports the whole of the heel forming instrumentalities is mounted for pivotal movement about an axis Q near to the toe region of the mould forepart 312. Pivoting of the plate 374 is effected by an adjusting screw 612 connected at 614 to a portion of the frame of the machine and connected via a connecting rod 616 to a rear portion 618 of the plate 374. Thus, as shown in FIG. 20, the plate 374 is pivoted upwardly so that the mould backpart 314 assumes the proper relationship with the mould forepart 312 and so that the proper relationship between the mould backpart 314 and the wiper mechanism and heel former is maintained.

Figure 32:
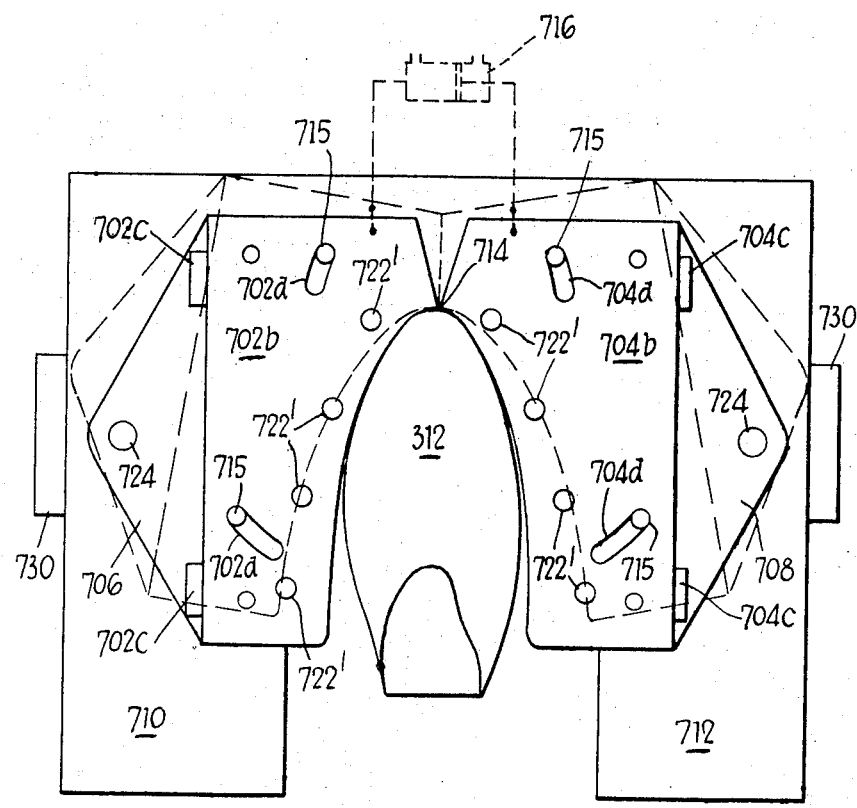
FIGS. 32, 33 and 34 are respectively a plan view, an end view and a side view of a part of a modified form of the apparatus.
Figure 33:
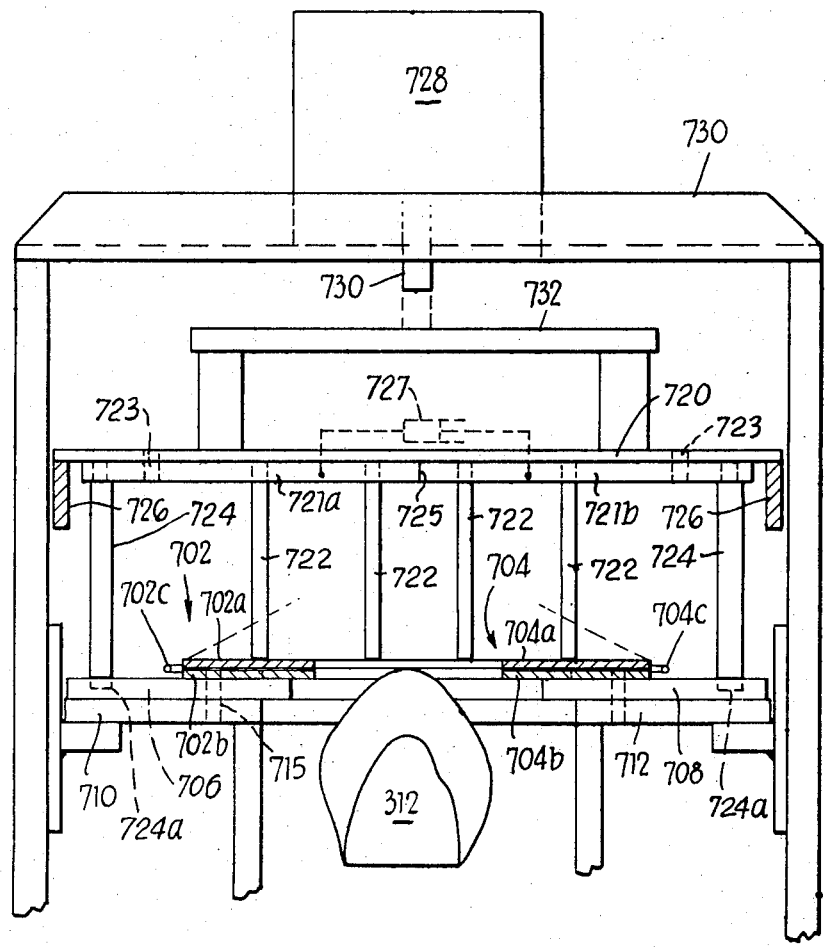
Figure 34:
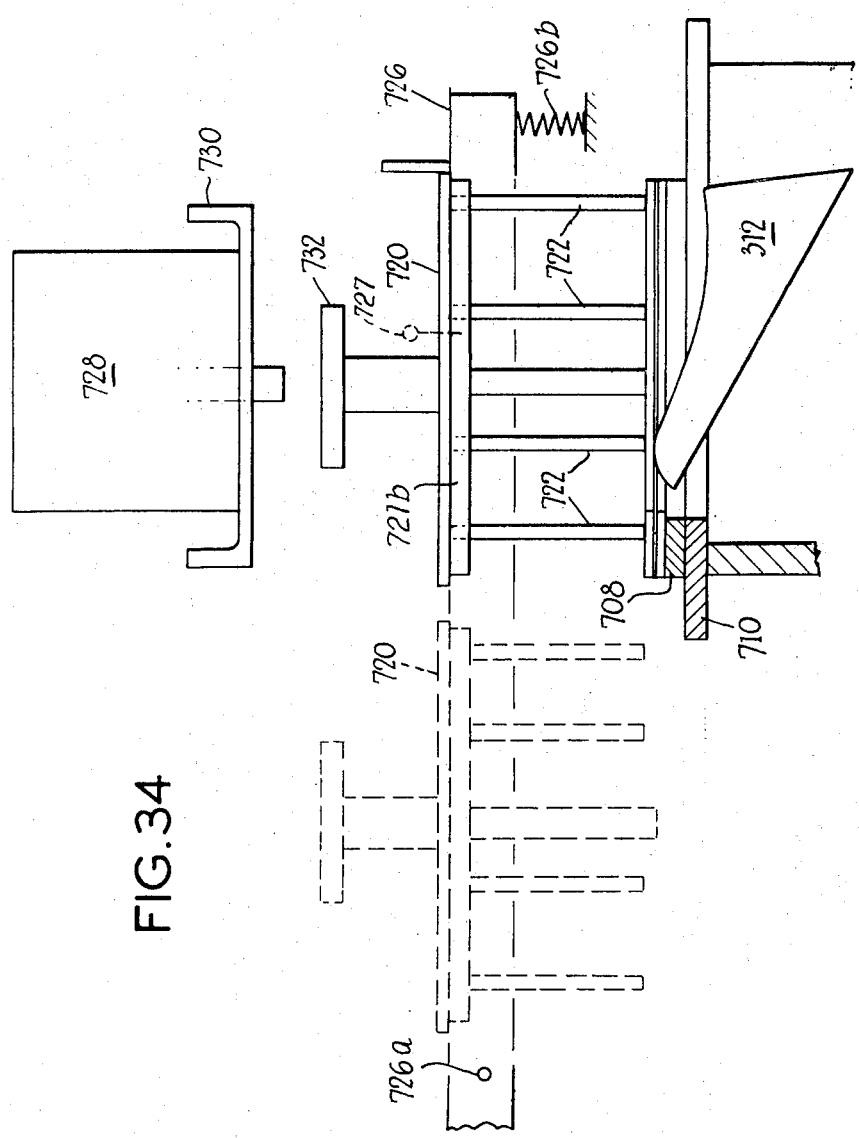

In the modified form of apparatus of FIGS. 32 to 34, an alternative clamping arrangement is shown. The object of the alternative clamping arrangement is to facilitate the loading of the upper into the clamp. To this end, the clamp comprises two halves 702, 704, each comprising upper and lower plates hinged together. The upper plates are designated 702a and 704a, the lower plates by 702b and 704b and the hinges by 702c and 704c.

The clamp plates 702b and 704b are fixed respectively on swivel plates 706, 708 which in turn are supported on base plates 710 and 712 respectively. The arrangement is such that by effecting swivelling movement of the plates 706 and 708, the clamp halves 702 and 704 can be pivoted away from and towards one another. The pivotal movement is about a pivot point 714 at a position corresponding to the toe. The pivotal movement is controlled by pins 715 which are secured to the base plates 710 and 712, there being four pins 715 which project through slots 702d which extend through the swivel plate 706 and the lower clamp plate 702b and slots 704d which extend through the swivel plate 708 and through the lower clamp plate 704b. The slots are arcuate concentric with the pivot point 714 as can best be seen in FIG. 72 which is a plan view but with the upper portions of the apparatus, including the upper plates 702a removed.

In order to effect the pivoting of the two clamp halves towards and away from one another, a double acting fluid or air pressure actuator 716, indicated only diagrammatically in FIG. 32, is provided and is linked to the swivel plates 706, 708.

The means for securing the clamping plates in the clamping position is similar to the previous embodiment and comprises a clamping frame 720 having clamping pins 722 arranged around the operative edges of the clamp. However, the pins 722 are carried on a further pair of swivel plates 721a and 721b attached to the underside of the frame 720 by pin and slot arrangements indicated diagrammatically at 723 which permit the plates 721a and 721b to swivel towards and away from each other about a vertical axis 725 in a manner similar to the two clamp halves. A further actuator 727 (shown only diagrammatically) effects the swivelling of the plates 721a and 721b. The position of the pins 722 is indicated by the reference number 722' in FIG. 32 but, as explained above, the pins themselves are not actually shown in FIG. 32. The plates 721a and 721b also carry two further pins 724 which can engage in recesses 724a in plates 706 and 708 and are for interconnecting the swivel plate 706 with the plate 721a and the plate 708 with the plate 721b and for pressing the plates 706 and 708 against the base plates 710 and 712 respectively. The clamping frame 720 is movable horizontally along rails 726 between the positions shown respectively in full and broken lines in FIG. 34. An actuator 728 mounted on the main frame 730 of the machine is provided above the clamps and has an actuating member 730 engageable with a bridge 732 which is secured on top of the frame 720.

To load an upper into the machine, the clamping frame 720 is assumed to be at the position shown in broken lines in FIG. 34 and the swivel plates 721a, 721b are pivoted outwardly. Also the swivel plates 706, 708, together with the clamp halves, are pivoted outwardly to the position shown in broken lines in FIG. 32. The upper plates 702a and 704a are raised about the hinges 702c and 704c respectively to enable the upper to be placed on the lower plates 702b and 704c. As in the previous embodiment, positioning means in the form of pins are preferably provided on the lower plates 702b, 704b of the clamp to position the edge of the upper as required. The clamps are then closed by pivoting the upper plate 702a and 704a into the position shown in FIG. 33. The frame 720 is then moved from the dotted line position of FIG. 34 to the full line position and the actuator 728 operated to lower the pins 724 into the recess 724a and apply light pressure to the clamps via the pins 722 and 724. Thereafter the actuators 716 and 727 are energised to swing the swivel plates inwardly bringing the clamp halves with them so that the clamp halves are moved towards one another to the full line position shown in FIG. 32. When the full line position is reached, the actuator 728 is further actuated to apply high pressure to the clamps to effect secure clamping of the upper. The pins 724 act to supply balancing pressure to the swivel plates to prevent any tendency for the outer edges of the swivel plates to be lifted from the base plates 710, 712 due to the action of the pins 722 on the clamp. Forming then takes place as described with reference to the previous drawings. The rails 726 are pivoted at 726a to permit the movement, against the action of spring 726b, when the actuator 728 is operated to move the frame 720 downwardly. After the forming operation, the moulds are retracted, the clamps released to enable the upper to be removed, and the apparatus reset with the swivel plates open and clamping frame retracted ready for the insertion of a further upper to be formed.

Various other modifications and alternatives are possible within the scope of the invention. For example, although the arrangement described with reference to the drawings has employed a heated forepart mould and a cooled rear part mould, if the apparatus is to be used for preforming uppers of poromeric or other synthetic material, both parts of the mould may be cool. Also, means other than the circulation of coolant through the moulds may be employed for cooling, such as cool air blasts. Where one part of the mould is heated or cooled and the other is not, heat insulation may if desired be provided between the forepart and the backpart, e.g., in the channel 608.

Although a wiper mechanism has been shown for folding the lasting margin of the heel beneath the mould backpart, alternative means could be employed, such as stringers. Also, the conveyorised clamping arrangement described in that provisional specification could be employed in the present invention, i.e, an arrangement in which the upper to be formed is held in a clamp which is moved from station to station, for example from a mulling station to the forming station.

In the arrangement described with reference to the accompanying drawings, the plate 300a may be removably mounted on the pins 304 and the plate 300b may also be removably mounted so that the clamp can be exchanged for a clamp of different size to take account of different sizes or styles of shoe. It may be unnecessary, however, to provide for replacement of the pin assembly when the clamps are changed since the range of variation in the sizes of the clamps will be relatively small.

The arrangement by which the plate 374 is pivoted also permits this plate to be moved below the level shown in FIG. 1 as well as above it as shown in FIG. 20. Thus, moulds in which the heel part is lowered relative to the forepart may also be utilised in the apparatus described with reference to the drawings.

As an alternative to the heel height gauge illustrated in FIGS. 6 and 7, a simple projection on the back of the mould backpart may be used, but this may not be so satisfactory as the arrangement shown in the drawings since, if the projection is relatively small, it may fail to engage the top edge of the heel of the upper, or if it is relatively large, relative movement between the projection and the top edge of the heel of the upper may cause surface damage to the upper.

As has been explained, a variety of adjustments are possible in the machine. It is also preferred that the support member 302, on which the clamp 300 is mounted, is adjustable from left to right as seen in FIG. 1. The plate 398 should be adjustable on the plate 374 and the plate 399, as described, is adjustable on the plate 394. Thus, adjustment of the position of the plate 398 effects an adjustment of the heel former and adjustment of the position of the plate 399 effects an adjustment of the wiper. The mounting 402 of the actuator 400 on the plate 398 may require adjustment if the plate 398 is adjusted on the plate 374, in order to ensure that the mould backpart 314 is raised to its correct position in the required relationship to the mould forepart 312.

Alternative clamping arrangements to that shown in the drawings are possible. Any means for gripping the blank may be employed.

Although the embodiment described with reference to the drawings has been specifically intended for forming leather shoe uppers, and therefore the mould forepart is heated, the apparatus could be modified for forming shoe uppers of poromeric or other synthetic upper material. In this case, the forepart of the mould may simply be cold, or may be forcibly cooled as by making the forepart mould hollow and passing coolant through it.

The heel height control mechanism 410 has been illustrated as mounted on the support 306. The mechanism 410 may be adjustably attached to the support 306 for movement left or right to accommodate different mould sizes. If desired, this adjustment may be achieved by mounting the arm 422 on a bridge structure fixed to plate 398 instead of support 306. Plate 398 is adjusted for mould size and arm 422 would then be automatically adjusted with it. Arm 422 could be similarly fixed to frame 374, as an alternative, and would then be provided with adjustment for mould sizes. Any of the above arrangements might be used to optimise operation of a machine.

The back former has been illustrated as a solid moulded pressure member. As one alternative to this, an air bag or the like might be used for back forming.

This disclosure of the specifications of each of our aforesaid patent applications and patents is hereby incorporated herein by reference.

What we claim is:

1. Apparatus for preforming shoe uppers, comprising means for holding the edge of an upper to be formed; a forepart mould; a backpart mould; and means for moving each said mould relative to said holding means from an inoperative position to a moulding position, said moulds when in said moulding position cooperating to define a substantially continuous moulding surface corresponding substantially to the whole of the upper to be formed.

2. Apparatus according to claim 1, wherein said moving means is operative to move said moulds to said moulding position is sequence.

3. Apparatus according to claim 2, wherein said moving means is operative to move said backpart mould into said moulding position prior to movement of said forepart mould into said moulding position.

4. Apparatus according to claim 1, wherein said moving means is operative to move said backpart mould along an arcuate path.

5. Apparatus according to claim 4, wherein said arcuate path is such that the portion of said backpart mould corresponding to the heel of the upper first enters an upper held in said holding means.

6. Apparatus according to claim 4, wherein said moving means includes a lever on which said backpart mould is mounted, said movement of said backpart mould along said arcuate path being effected by pivoting of said lever.

7. Apparatus according to claim 1, wherein said moving means is operable to effect both bodily movement and rotary movement of said forepart mould relative to said holding means when said forepart mould is moved to said moulding position.

8. Apparatus according to claim 7, wherein said moving means is operable to effect said rotary movement of said forepart mould simultaneously with said bodily movement.

9. Apparatus according to claim 8, wherein said moving means is operable to effect said bodily movement of said forepart mould initially without any rotary movement of said forepart mould and to effect said rotary movement of said forepart mould simultaneously with a final portion of said bodily movement.

10. Apparatus according to claim 8, wherein said moving means comprises a reciprocable member upon which said forepart mould is mounted for effecting said bodily movement thereof and pivot means interconnecting said forepart mould with said reciprocable member for providing for said rotary movement of said forepart mould.

11. Apparatus according to claim 10, wherein said moving means further comprises a first member fixed with respect to said forepart mould and a second member fixed with respect to said holding means, said first and second members being interengageable upon reciprocation of said reciprocable member for effecting said rotary movement of said forepart mould.

12. Apparatus according to claim 11, wherein said second member comprises a cam surface and said first member includes a cam element engageable with and movable along said cam surface when in engagement therewith, said cam surface being shaped to control said rotary movement of said forepart mould.

13. Apparatus according to claim 11, including adjusting means for adjusting the position of said second member with respect to said holding means.

14. Apparatus according to claim 7, wherein said moving means is operable to move said forepart mould initially towards said moulding position with the portion of said forepart mould corresponding to the toe of the upper leading.

15. Apparatus according to claim 14, wherein said rotary movement is such that in the final stage of said bodily movement, said portion of said forepart mould corresponding to the toe of the upper moves relative to said holding means in a direction opposite to said bodily movement.

16. Apparatus according to claim 7, wherein said bodily movement comprises a major component towards an upper held in said holding means and a minor component towards the toe end of said upper.

17. Apparatus according to claim 1, wherein said forepart mould and said backpart mould include portions which interfit with each other when said moulds are in said moulding position.

18. Apparatus according to claim 1, including cooling means for said backpart mould.

19. Apparatus according to claim 1, including heating means for the forepart mould.

20. Apparatus according to claim 1, including cooling means for the forepart mould.

21. Apparatus according to claim 1, wherein said moulds are removable from said apparatus.

22. Apparatus according to claim 1, wherein said moulding surface has a shape which is a development of the shape of a last corresponding to the upper to be formed.

23. Apparatus according to claim 22, wherein said development is a shape such that a line extending around the moulding surface and corresponding to the feather edge of the upper to be formed lies in a single plane.

24. Apparatus according to claim 22, wherein said development is such that the shape of the portion of the moulding surface corresponding to the heel region of the last is substantially of the same shape as the last, and the portions of the moulding surface corresponding to the waist portions and forepart portions of the last are spread out relative to the shape of the last.

25. Apparatus according to claim 22, wherein the shape of said moulding surface corresponds to a partial flattening of the forepart of the last.

26. Apparatus according to claim 22, wherein said development is such that a line around said moulding surface corresponding to the feather edge of the upper to be formed has a portion around the forepart lying in a first plane, portions at the inside and outside waist lying in a second plane, and a portion around the heel lying in a third plane, said third plane being higher, relative to the upper to be formed, than said first plane.

27. Apparatus according to claim 1, wherein said moulding surface is of the same shape as a last corresponding to the upper to be formed.

28. Apparatus according to claim 1, including a female heel former operable to envelop the heel portion of said backpart mould when in the moulding position for assisting in forming the heel of the upper.

29. Apparatus according to claim 28, wherein said heel former comprises first and second side portions movable with respect to each other between open and closed positions, said closed position being for effecting said enveloping.

30. Apparatus according to claim 29, wherein said heel former is displaceable between an inoperative position and an operative position, and including means for effecting closing of the former in response to movement to its operative position and opening of the former in response to movement away from the operative position towards the inoperative position.

31. Apparatus according to claim 28, wherein the heel former is of flexible mouldable material having a degree of hardness sufficient to effect forming pressure on an upper in the apparatus.

32. Apparatus according to claim 1, including a wiper mechanism for wiping the lasting margin of the backpart of the upper inwardly relative to the backpart mould.

33. Apparatus according to claim 28, including a wiper mechanism for wiping the lasting margin of the backpart of the upper inwardly with respect to the mould, and means for simultaneously operating the heel former and the wiper mechanism.

34. Apparatus according to claim 32, wherein said wiper mechanism comprises a pair of blades movable inwardly with respect to the backpart mould.

35. Apparatus according to claim 22, including a wiper mechanism for wiping the lasting margin of the backpart of the upper inwardly with respect to the backpart mould, and a common support carrying said backpart mould, said heel former and said wiper mechanism, and including means for adjusting the position of said common support relative to said holding means.

36. Apparatus according to claim 35, wherein said adjusting means comprises means for effecting pivotal movement of said common support about an axis transverse to said moulding surface.

37. Apparatus according to claim 1, including a heel height gauge operative to locate the heel of the backpart at a predetermined height relative to the backpart mould, during movement of the backpart mould into its moulding position.

38. Apparatus according to claim 37, wherein said backpart mould is movable along an arcuate path into its moulding position and said heel height gauge is movable along an arcuate path, concentric with the path of the backpart mould, as the backpart mould is moved to its moulding position.

39. Apparatus according to claim 37, wherein the heel height gauge comprises a blade, and said backpart mould is formed with a slot for receiving said blade when the backpart mould is moved to its operative position.

40. Apparatus according to claim 37, including means for moving said heel height gauge to an inoperative position clear of said backpart mould and said upper upon completion of a forming operation.

41. Apparatus according to claim 40, wherein said means for moving said heel height gauge is also operative to release said holding means.

42. Apparatus according to claim 1, wherein said holding means is operative to hold the edge of the upper only at the forepart thereof.

43. Apparatus according to claim 1, wherein said holding means is a clamp.

44. Apparatus according to claim 43, wherein said clamp includes positioning means for defining the required position of the edge of an upper held in the clamp.

45. Apparatus according to claim 43, wherein said clamp is in two halves which are movable pivotally with respect to each other about an axis at a point corresponding to the toe of the upper and vertical with respect to the upper.

46. Apparatus according to claim 45, including power means for effecting said pivotal movement of said two clamp halves.

* * * * *